Patented Sept. 26, 1944

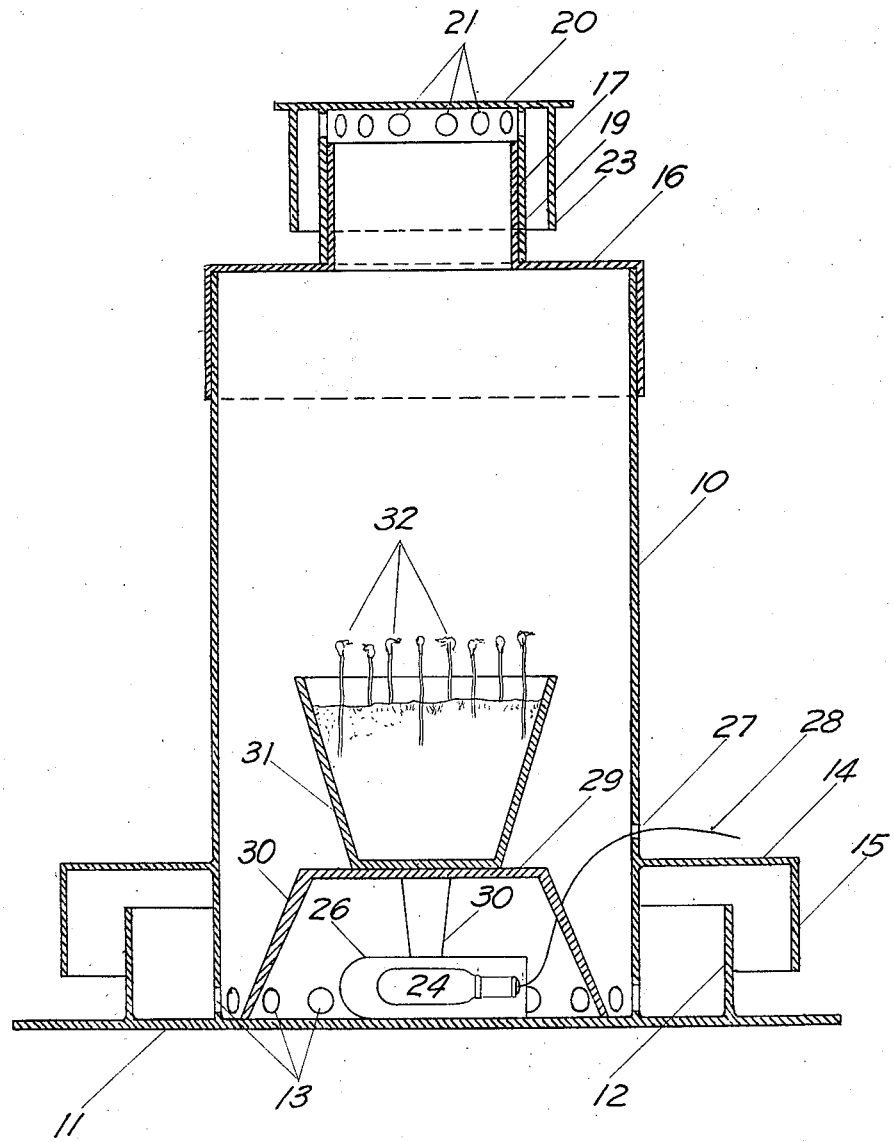

2,358,882

UNITED STATES PATENT OFFICE 2,358,882

METHOD OF TESTING FOR ETHYLENE

Percy W. Rohrbaugh, Upland, Calif., assignor to California Fruit Growers Exchange, Los Angeles, Calif., a corporation of California Application March 16, 1942, Serial No. 434,856

6 Claims. (Cl. 73—23)

This invention relates to a method of testing atmospheres for the presence of ethylene. More particularly the invention relates to methods of testing for the presence of ethylene in the atmosphere by means of plants showing epinasty response.

It has been known for a considerable period of time that ethylene produces a curious effect on some plants. It has been observed, for example, that etiolated pea seedlings show a marked reduction in the rate of stem elongation, and often show an increase in stem diameter. Other plants, for example, the tomato plant or sunflower plant, respond differently to the presence of ethylene. With these the leaves show epinasty bending.

Although, as mentioned before, the epinasty response of certain plants has been known for some time, there has not been up to the present time, so far as I am aware, any method or means of correlating this plant response so as to be able to measure directly the presence and amount of ethylene in a given atmosphere as, for example, the atmosphere of a fruit storage room. The desirability and need for some simple test whereby the presence and approximate amount of ethylene present in the atmosphere could be determined has for a long time been well recognized. In connection with the storing of fruits such as lemons, apples, and bananas, the presence of ethylene in the atmosphere is very undesirable since it tends to accelerate the maturing of the fruit and the development of color. With lemons, for example, a comparatively small amount of ethylene in the storage atmosphere tends to accelerate the curing of the fruit as well as the development of the yellow color and to promote loosening of the buttons.

Unfortunately, in the past, presence of the unwanted ethylene in the storage room has only been evidenced by observing the detrimental effect on the fruit. When these have already occurred, it is obviously too late to take precautionary measures to prevent or counteract them. There has, moreover, been no simple and satisfactory method available for determining the presence of ethylene in storage rooms. Gas analysis of the storage atmosphere could, of course, be undertaken, but this would not only involve elaborate equipment but the employment of highly skilled technicians.

This response of certain plants to the presence of ethylene is often referred to as chemotropism or epinastic response. Tomato plants, castor beans, potato sprouts, and pea plants, especially the latter which have been grown in darkness, will, when placed in an atmosphere containing ethylene, show chemotropism.

The epinasty response is often more apparent from observing the effect on etiolated plants. However, it has not been possible to take advantage of the sensitivity of these plants because there has been no method available for growing the plants in darkness in the atmosphere to be tested, under the conditions desirable for plant growth. It is to be pointed out that it is very desirable during the test that the growth activity of the plants be at a maximum and that this growth activity continue in the absence of light during the test period. In order to maintain maximum growth activity of the plant it is necessary to maintain the test plants at a temperature proper for their continued active growth, which temperatures are usually very considerably above the storage temperatures at which fruit is ordinarily stored for optimum keeping. At the same time continuous circulation of the storage atmosphere about the growing plants is necessary in order to obtain a satisfactory test.

The present invention relates, therefore, to a method of testing atmospheres for the presence of ethylene whereby at least a portion of the atmosphere to be tested is circulated into the presence of growing epinasty responsive plants. During the period of the test the plants are preferably maintained at such a temperature as to promote maximum growth of the plants. Accordingly, an object of this invention is to disclose a method of testing atmospheres for the presence of ethylene by the use of epinasty responsive plants.

Another object of this invention is to disclose a simple and effective method of testing for the presence or absence of ethylene, which method is adaptable to present day fruit storage conditions.

These and other objects, uses, and advantages of this invention will become apparent to those skilled in the art as the description proceeds in connection with the accompanying drawing in which the single figure is a vertical, cross-sectional view of a device which is suitable for use in connection with my method for determining the presence of ethylene. This device is disclosed and claimed in my co-pending application Serial No. 432,103, filed February 24, 1942.

Referring to the drawing in detail, the embodiment illustrated comprises a cylindrical housing 10, which has attached thereto and is supported by a base plate 11. An upstanding, annular baffle 12 surrounding and spaced from the cylindrical housing is attached at right angles to the base plate 11. A series of air intakes 13 are formed around the periphery of the cylindrical housing 10, adjacent to the base plate 11. An annular ring 14, attached at right angles to the cylindrical housing 10, is adapted to extend out over the baffle 12. Extending downwardly from the ring 14 and at right angles thereto is an annular skirt 15. Parts 12, 14, and 15 of the device are so constructed as to form a light maze to prevent passage of light to the interior of the cylindrical housing by means of the air intake 13.

A collar 16 with neck 17 is adapted to be positioned over the upper end of the cylindrical housing 10.

A cap having a main body 19 is constructed so as to fit tightly over the neck 17 of the collar 16. It is to be noted that the main body 19 of the cap is of greater length than the neck 17 of the collar so that the top 20 of the cap will be held above and away from the neck 17, the reason for which will become apparent hereinafter. A series of air outlets 21 are formed around the upper periphery of the main body of the cap 19. An annular skirt 23 surrounding and positioned away from the main body of the cap 19 depends from the top 20 of the cap in a manner adapted to form a light maze for the air outlets 21. It will be readily seen that when the cap is in position on the device, the neck 17 of the collar 16 does not close the air outlet 21.

Air may circulate into the bottom of the device by passing under the annular skirt 15 and over the baffle 12 into the air intake 13, thence up through the housing and out through the air outlet 21 and past the skirt 23. The movement or circulation of the air in the above described direction is promoted by a heating element 24 positioned within the housing 10. The heating element 24 as represented is an electric light bulb which in turn is encased within a light shield 26. The type of heating element is not important except that it should give no light to the interior of the housing and should satisfactorily maintain the temperature of the contents of the device and the atmosphere passing therethrough at a temperature of about 78° F. Actually in practice I have found that two 15-watt carbon filament light bulbs wired in series and enclosed within collapsible tubes are satisfactory to maintain the temperature within the proper range for growing the test plants when the device is used in storage rooms wherein the temperature range is maintained between about 55° F. and 58° F.

Obviously if the device and test method is used for atmospheres below or above the range of from 55° F. to 60° F., suitable changes in the heat output of the heating element may be made in order to have the contents of the device and the air passing therethrough within the desired growing range for the plants being used for the test.

Under certain circumstances it may be desirable to use the device and the method of testing apart from storage rooms as, for example, in testing for ethylene adjacent to highways. In such cases a heating element probable will not be needed if the outside temperature is not materially below the growing temperature range for the test plants.

A small opening 27 in the side of the cylindrical housing 10 is provided to admit the electric cord 28 carrying the necessary current for the heating element. This opening is, of course, light proof.

A table 29 having legs 30 is positioned within the housing and is adapted to support the container 31 within which the test plants 32 are grown.

As mentioned before, my test method is used in connection with those plants showing epinasty response, for the purpose of determining the presence or absence of ethylene in various atmospheres, and particularly those atmospheres within fruit storage chambers. If it is desired to test the atmosphere in a storage room for the presence of ethylene, I find it desirable to use pea seedlings which have been germinated and grown in the dark. The germination and growth of the pea seedlings may be satisfactorily accomplished in the following manner.

A soil mixture comprising sand, water, and peat moss in the ratio of 1:2:3 by volume is first prepared. Suitable containers, as, for example, cans of about 4" in diameter and 2" in height are filled two-thirds full with the soil mixture. About twenty pea seeds of the Alaska pea variety are placed in the can and additional soil mixture is placed on top of the seeds until the can is full or nearly so. If it is desired to speed the germination of the pea seeds, they may be first soaked in water, preferably warm, for about one hour. The containers with the seeds planted therein are placed in a germinating room in the dark. The temperature of the room is maintained at about 70° F., if such is the temperature which is to be maintained within the testing chamber. It is desirable to germinate and grow the pea seedlings at about the same temperature as that which is to be subsequently maintained in the testing chamber since one can of peas is ordinarily allowed to continue growth in the germinating room to serve as a check or control on the peas used for the test. The pea seedlings are allowed to grow in the dark until they are about one or two inches high. A can of the seedlings is then placed on the table in the testing device and the device is placed in the storage room containing the atmosphere to be tested. During this transfer, undue exposure to light is avoided. The heating element is put into operation and the peas are allowed to continue growth in the testing device for a period of from three to four days. If appreciable quantities of ethylene exist in the storage atmosphere, visible epinasty response may be observed within 12 hours, although with the concentrations of ethylene more commonly found in storage rooms I find the peas may have to be allowed to grow from about two to four days, in order to make a positive determination. If very small amounts of ethylene are present in the storage atmosphere it may be desirable to allow the peas a longer period of growth in the storage atmosphere. If, on the other hand, the concentration of ethylene is relatively high, a shorter period of time may be sufficient. As previously mentioned, a control can of pea seedlings is germinated and grown under the same conditions as the pea seedlings used in the test. These control pea seedlings are allowed to continue growth in the dark in the germination room for a period of time corresponding to that of the test peas.

At the end of the test period the pea plants are taken from the testing device and the epinasty response of the pea seedlings is observed, both indirectly by inspection, and directly by comparing these pea seedlings with the pea seedlings germinated and grown under similar circumstances but in the absence of ethylene.

In general the first noticeable bending of the stems takes place with an ethylene concentration of about 0.05 to 0.1 part per million in the atmosphere. With about 0.1 to 0.5 part per million of ethylene various degrees of horizontal bending or declination occur. Horizontal declination with some swelling of the stem indicates an ethylene concentration of from about 0.5 to 0.75 part per million. Above about 0.75 part per million I find that little if any terminal growth takes place under the conditions outlined.

It can be seen, therefore, that it is possible to determine with reasonable accuracy not only the actual presence of ethylene but also the approximate amount of ethylene present in the atmosphere being tested. After becoming familiar with the test one may easily determine as little as one part of ethylene in 20 million parts of the atmosphere being tested. Furthermore, amounts of ethylene in the storage atmosphere which are capable of producing an observable effect on the test plants by the method outlined within three or four days may not produce an observable effect on the fruit for a period of two or three weeks, or even a month, at which time the damage will have already occurred. Thus it is seen that within a comparatively short time I can determine the presence of any unwanted ethylene. The conditions causing this can then be corrected, or increased circulation of un-contaminated air can be provided for to offset its effects, all of which can be done before any substantial ill effects have arisen.

Many gases have been tested as to their power to induce epinasty, but of the many gases tested only five, carbon monoxide, ethylene, acetylene, propylene, and butylene were effective. Of these five, ethylene was many hundred times more effective than any of the others. In other words, it would take relatively high concentrations of these other gases to produce epinasty response in the test plants. Similarly, it has been rather conclusively shown that the accelerated maturation occurring during storage is directly attributable to ethylene.

For the adaptation of my test method for fruit storage atmospheres which are maintained at comparatively low temperatures, it may be found necessary to increase the heat output of the heating element in order to maintain the atmosphere within the testing chamber at that level necessary for maximum growth of the pea plant. Such a situation is particularly likely to be present when apple storage atmospheres are tested for the presence of ethylene by this method.

Having thus described my invention in such clear, concise, and exact language as to enable others skilled in the art to practice the same, I claim as my invention and desire to secure by Letters Patent the following:

1. A method of testing fruit storage atmospheres for ethylene comprising passing a current of the fruit storage atmosphere to be tested through a substantially light-proof device containing growing etiolated pea seedlings, maintaining the temperature of the pea seedlings within a range suitable to promote their rapid growth, continuing the passage of the current of atmosphere through said device for a time sufficient to permit an observable epinasty response by said pea seedlings, and subsequently comparing said pea seedlings with standard pea seedlings grown under similar conditions but in an atmosphere conducive to promoting growth free from epinastic response, whereby to test whether ethylene is present in the fruit storage atmosphere in quantity sufficient to hasten ripening of such fruit.

2. A method of testing fruit storage atmospheres for ethylene comprising passing a current of the fruit storage atmosphere to be tested through a substantially light-proof device containing growing etiolated pea seedling, maintaining the temperature of the pea seedlings within the range of about 70° F. to 80° F. to promote their rapid growth, continuing the passage of current of atmosphere through said device for a time sufficient to permit an observable epinasty response by said pea seedlings and subsequently comparing said pea seedlings with standard pea seedlings grown under similar conditions but in an atmosphere conducive to promote growth free from epinastic response, whereby to test whether ethylene is present in the fruit storage atmosphere in quantity sufficient to hasten ripening of such fruit.

3. A method of testing citrus fruit storage atmospheres for ethylene comprising passing a current of the fruit storage atmosphere to be tested through a substantially light-proof device containing growing etiolated pea seedlings, heating the atmosphere passing therethrough to within a range to promote rapid growth of the pea seedlings, continuing the passage of the current of atmosphere through the device for a time sufficient to permit an observable epinasty response by said pea seedlings and subsequently comparing said pea seedlings with standard pea seedlings grown under similar conditions but in an atmosphere conducive to promoting growth free from epinastic response, whereby to test whether ethylene is present in the fruit storage atmosphere in quantity sufficient to hasten ripening of such fruit.

4. A method of testing fruit storage atmospheres for ethylene comprising passing a current of the fruit storage atmosphere to be tested through a substantially light-proof device containing growing epinasty responsive plants, maintaining the temperature of said plants within a range suitable to promote their rapid growth, continuing the passage of the current of atmosphere through said device for a time sufficient to permit an observable epinasty response by said plants, and subsequently comparing said plants with standard plants grown under similar conditions but in an atmosphere conducive to promoting growth free from epinastic response, whereby to test whether ethylene is present in the fruit storage atmosphere in quantity sufficient to hasten ripening of such fruit.

5. A method of testing an atmosphere for ethylene comprising passing a current of the atmosphere to be tested through a substantially light-proof device containing growing etiolated pea seedlings, maintaining the temperature of the pea seedlings within a range suitable to promote their rapid growth, continuing the passage of the current of atmosphere through said device for a time sufficient to permit an observable epinasty response by said pea seedlings, and subsequently comparing said pea seedlings with standard pea seedlings grown under similar conditions but in an atmosphere conducive to promoting growth free from epinastic response, whereby to test whether ethylene is present in the atmosphere in quantity sufficient to hasten ripening of fruit stored therein.

6. A method of testing an atmosphere for ethylene comprising passing a current of the atmosphere to be tested through a substantially light-proof device containing growing epinasty responsive plants, maintaining the temperature of said plants within a range suitable to promote their rapid growth, continuing the passage of the atmosphere through said device for a time sufficient to permit an observable epinasty response by said plants, and subsequently comparing said plants with standard plants grown under similar conditions but in an atmosphere conducive to promoting free from epinastic response, whereby to test whether ethylene is present in the atmosphere in quantity sufficient to hasten ripening of fruit stored therein.

PERCY W. ROHRBAUGH.

CERTIFICATE OF CORRECTION.

Patent No. 2,358,882. September 26, 1944.

PERCY W. ROHRBAUGH.

It is hereby certified that error appears in the printed specification of the above numbered patent requiring correction as follows: Page 3, second column, line 8, claim 2, for "seedling" read --seedlings--; line 17, same claim, for "promote" read --promoting--; page 4, second column, line 3, claim 6, after "promoting" insert --growth--; and that the said Letters Patent should be read with this correction therein that the same may conform to the record of the case in the Patent Office.

Signed and sealed this 5th day of December, A. D. 1944.

Leslie Frazer (Seal)

Acting Commissioner of Patents.